United States Patent [19]

Best

[11] Patent Number: 4,970,086

[45] Date of Patent: Nov. 13, 1990

[54] EXPANDED LOW DENSITY SNACK PRODUCT AND PROCESS OF MAKING

[75] Inventor: Eric T. Best, York, England

[73] Assignee: Nestec S.A., Vevey, Switzerland

[21] Appl. No.: 269,425

[22] Filed: Nov. 10, 1988

[30] Foreign Application Priority Data

Nov. 10, 1987 [GB] United Kingdom ............... 8726310

[51] Int. Cl.⁵ .................. A23L 1/53; A21D 13/06
[52] U.S. Cl. .................................. 426/564; 426/549; 426/559; 426/562; 426/808; 426/516; 426/615; 426/637; 426/661
[58] Field of Search ............... 426/564, 549, 562, 559, 426/808, 516, 615, 637, 661

[56] References Cited

U.S. PATENT DOCUMENTS

| | | | |
|---|---|---|---|
| 3,574,634 | 4/1971 | Singer | 426/549 |
| 3,650,769 | 3/1972 | Fritzberg | 426/559 |
| 3,821,428 | 6/1974 | Farkas | 426/559 |
| 4,069,348 | 1/1978 | Bush | 426/396 |
| 4,525,367 | 6/1985 | Allison | 426/396 |
| 4,806,087 | 2/1989 | Hayashi | 426/516 |

*Primary Examiner*—Marianne Cintins
*Assistant Examiner*—Helen Pratt
*Attorney, Agent, or Firm*—Vogt & O'Donnell

[57] ABSTRACT

An expanded low density snack food product is prepared by first aerating a plastic mass of an edible particulate snack food base material, an edible film forming material, an edible viscosity modulator, an edible protein and water. The aerated mass then is heated in a chamber for setting the mass while applying a vacuum in the chamber for expanding the aerated mass, after which the vacuum is released, and the expanded mass is removed from the chamber.

19 Claims, No Drawings

EXPANDED LOW DENSITY SNACK PRODUCT AND PROCESS OF MAKING

FIELD OF THE INVENTION

This invention relates to aerated snack products and to processes for their manufacture.

BACKGROUND OF THE INVENTION

Known aerated edible products include meringues. They are produced by cooking an aerated egg-white mixture. The air bubbles in the mixture do not expand during cooking.

Known aerated snack products are generally vegetable (e.g., potato) or fruit-based. They tend either to be very dry and brittle or to have a greasy texture.

Aerated vegetable or fruit-based snack products are usually formed by extruding material of a dough-like consistency, in order to set up internal shear forces which cause the dough to become plastic, so enabling it to expand on heating. The plastic mass is then subjected to high temperatures, to convert water in the mass to steam. The steam generates hollows which, when the heat treated mass is dried, fill with air which results in a product having a puffed structure. Doughs used in such processes have a low moisture content, usually not exceeding 10%, otherwise shear forces will not be set up within the dough when it is extruded and it will not become plastic. No moisture is added to the plastic mass after extrusion because, if it is not viscous enough when heated, steam will escape from, rather than form hollows within the plasticised mass, with the result that it will collapse and will not form a puffed structure.

Steam may be generated by the use of cooker-extruders or microwave ovens in the case of dry products, or by frying the plastic mass in oil or fat, in the latter case, the product has a greasy texture. However, it is difficult to obtain defined and regular product shapes by using these techniques and often the product has uneven aeration.

Steam generated by these techniques requires high temperatures or long time periods. Such techniques result in the breakdown or removal of volatile materials such as the isoprenoids which are widely used as flavourings. Consequently, known aerated snack products are given topical coatings or dustings which are commonly fastened to the product by a fat wash. The resulting flavoured product has a high fat content, and the fat and powders can be transferred to the fingers during consumption. In addition, such products suffer from poorly flavoured centres.

SUMMARY OF THE INVENTION

The present invention is based on the discovery that light, crisp aerated snack products having a honeycomb-type structure which is of a substantially uniform nature can be prepared by using vacuum to enlarge air pockets which have been incorporated into a pre-mass formulation. The formulation of the pre-mass allows even distribution of air pockets and interstices therewithin. The product can be gelled or set by an irreversible reaction, by the application of radiant or microwave heat during expansion under vacuum. The use of oil or fat is avoided. In addition, if the product is flavoured, the flavour can be evenly distributed through the product. Flavour loss during production and on storage of the final product is minimised.

DETAILED DESCRIPTION OF THE INVENTION

A product of the present invention typically has a density of not more than 0.1, e.g., about 0.05 g/cm$^3$. It may be prepared from a novel composition which comprises a hydrocolloid or other film-forming component, added protein, a viscosity modulator, moisture and a base material such as a vegetable or fruit in particulate, cookable form. Other ingredients such as flavouring and colouring may also be included.

The hydrocolloid forms a film on the boundaries between air and the pre-mass formulation. Film formation can occur at both the internal boundaries and external boundaries of the formulation. Film formation on the external surface of the formulation results in a product having a smooth and unpitted outer surface. A, say, hydrocolloid also encapsulated elements such as conventional lipid-based flavours, e.g., isoprenoids. A typical hydrocolloid which can be used in the present invention is gum acacia although pectin or gelatin can be used as a partial extender up to a level of 30% of the total hydrocolloid content. The film-forming component is usually present at a level of 5 to 15% by weight of the pre-mass.

Added protein is required as a foam stabiliser during the incorporation of air into the pre-mass and on heating. Protein is also important during the heating stage as it denatures, so preventing structural collapse. Typically, milk or soya protein, e.g., hydrolysed whey fortified with casein, is used although egg albumen or gelatine may be used. The level of added protein is usually 1 to 3% by weight of the pre-mass.

An important component of the pre-mass formulation is a viscosity modulator, which is a material which has a viscosity which decreases upon heating which allows bubbles of air to expand and which also prevents them from joining and compensates for the increase in viscosity of the composition when moisture evaporates during heating. The use of a viscosity modulator results in a product having air bubbles which are evenly expanded throughout its structure. The composition contains the viscosity modulator in an amount of from 20% to 30% by weight. Typical materials that can be used as viscosity modulators are sugar syrups such as hydrolysed starch or glucose syrup. When 42 DE glucose syrup is used, the concentration of the syrup in the pre-mass formation is preferably 20 to 30% by weight. Other glucose syrups can be used, but the levels at which they are used are dependent on their specific viscosity characteristics.

The pre-mass composition requires a high level of moisture to enable the pre-mass to adopt a plastic rheology so that the pre-mass can be shaped. The total moisture content of the pre-mass is, for example, 15 to 30% by weight.

The base material to which the previously described functional components are added is typically powdered vegetable, e.g., potato, or powdered fruit, e.g., apple.

The process for producing a product of the present invention comprises aerating the pre-mass formulation, heating the aerated mass under vacuum, and releasing the vacuum. Air is incorporated into the pre-mass either by beating or mixing, for example using a planetary mixer at a rotor speed of 100–300 rpm for 0.5–5 minutes. Alternatively, a previously-prepared frappe may be folded into the pre-mass. A suitable frappe comprises:

| | |
|---|---|
| Glucose syrup, 42 DE | 48.5% |
| Invert sugar | 48.5% |
| Egg Albumen | 1.0% |
| Water | 2.0% | and is incorporated at 5 to 15% by weight of the pre-mass.

The pre-mass may be shaped if required by batch roller and rotary moulding techniques or by sheeting and die cutting. Batch roller processes enable the incorporation of filling pastes or gels. The formulation may be co-extruded with a flavouring for shaping the mass around the flavouring, the flavouring thereby being at the centre of the product.

Sheeting processes offer a number of other variations. For example, shapes cut from a single sheet expand into a honeycomb interior with a smooth skin. Multi-coloured laminates enable the production of differently coloured centres and exteriors. A double laminate sandwiching a layer of a blowing agent such as sodium bicarbonate, e.g., as baking powder, for example in an amount of up to 3% by weight of the formulation, will produce hollow shells.

By way of example, the thickness of the aerated pre-mass having a desired shape and composition is adjusted to 1 to 5 mm and is placed in a vacuum chamber. A vacuum within the range 10 to 250 mbar and a temperature within the range 80° to 180° C. is applied for up to 15 minutes; the conditions may be varied, dependent on the product size and shape. The heat may be applied by radiant heat or microwave techniques. After expansion, the vacuum is released.

The process is adaptable to either batch processing in boxes or to continuous processing (e.g. by using air locks to and from a conveyor within a vacuum chamber).

Products of the invention can be edible snackfoods as such, or they may be used as a component of, a sweet or savoury bar.

EXAMPLES

The following Examples 1 to 4 illustrate the invention. The amounts for the formulations are in percentages by weight.

EXAMPLE 1

Honeycomb Centre Potato Snack

Formulation:

| | |
|---|---|
| Potato powder | 39 |
| Gum acacia | 11 |
| Hydrolysed whey (casein fortified, 12% protein, 72% TS) | 19 |
| Water | 7 |
| Glucose syrup (42DE, 81.5% TS) | 24 |
| Flavouring/seasoning | trace |

Method:
(1) Place the potato powder, gum acacia and flavouring/seasoning into the bowl of a planetary mixer (e.g., Hobart) and blend.
(2) Add the hydrolysed whey, glucose syrup and water.
(3) Agitate for 3.5 minutes at a rotor speed of 150 rpm using mixing blade paddles.
(4) Sheet the pre-mass to a thickness of 35 mm.
(5) Cut into right-angled triangles in which the shorter sides are 35 mm long.
(6) Place the products, spaced 20 mm apart, in a vacuum chamber.
(7) Process for 10 minutes at a vacuum of 10 mbar and a temperature of 160° C.

As an alternative to this radiant process, the same formulation may be subjected to steps 1-6, followed by a microwave process comprising:
(7) Process for 1.5 minutes at 300 watts continuous rating.
(8) Process for a further 2 minutes at 300 watts continuous rating at a vacuum of 250 mbar.

EXAMPLE 2

Apple Puff

Formulation:

| | |
|---|---|
| Apple powder | 9 |
| Gum acacia | 5 |
| Gelatine solution (25% TS) | 4 |
| Sucrose solution (75% TS) | 62 |
| Glucose syrup (42 DE, 81.5 TS) | 20 |

Method:
(1) Place the apple powder and gum acacia into the bowl of a plantary mixer and blend.
(2) Add the sucrose, glucose and gelatin solutions.
(3) Agitate for 5 minutes at a rotor speed of 120 rpm using balloon whisk paddles.
(4) Pipe into lengths of 20 mm, diameter 3 mm.
(5) Place the products, spaced 20 mm apart, in a vacuum chamber.
(6) Process for 15 minutes at 15 mbar and 80° C.

EXAMPLE 3

Hollow Centre Snack

Formulation:

| | |
|---|---|
| Potato powder | 38 |
| Gum acacia | 9 |
| High methoxy pectin | 2 |
| Hydrolysed whey (casein fortified, 12% protein, 72% TS) | 18 |
| Water | 6 |
| Glucose syrup (42DE, 81.5% TS) | 24 |
| Baking powder | 3 |

Method:
(1) Place the potato powder, gum acacia and pectin into the bowl of a planetary mixer and blend.
(2) Add the hydrolysed whey, water and glucose syrup.
(3) Agitate for 3 minutes at a rotor speed of 150 rpm using mixing blade paddles.
(4) Sheet the pre-mass to a thickness of 1.0 mm.
(5) Dust evenly with the baking powder.
(6) Fold over.
(7) Roll to a final thickness of 1.0 mm.
(8) Cut into hollow rings with an inside diameter of 10 mm and an outside diameter of 40 mm.
(9) Place the products, spaced 20 mm apart, in a vacuum chamber.
(10) Process for 5 minutes at a vacuum of 10 mbar and a temperature of 160° C.

EXAMPLE 4

Extra Light Potato Puff

Formulation:

| | |
|---|---|
| Potato powder | 31 |
| Potato starch | 8 |
| Gum acacia | 10 |
| Hydrolysed whey (casein fortified, 12% protein, 72% TS) | 15 |
| Glucose syrup (42DE, 81.5% TS) | 25 |
| Frappe | 11 |

Method:
(1) Place the potato powder, potato starch and gum acacia into the bowl of a planetary mixer and blend.
(2) Add the hydrolysed whey and glucose syrup.
(3) Agitate for 5 minutes at a rotor speed of 190 rpm using mixing blade paddles.
(4) Fold in pre-prepared frappe using 1 second turns of the mixer until the pre-mass just attains a uniform appearance.
(5) Roll the pre-mass to a thickness of 4 mm, using a light dusting of potato starch to prevent the pre-mass sticking to the sizing rollers.
(6) Cut into squares 40 mm side length.
(7) Place the products, spaced 30 mm apart, in a vacuum chamber.
(8) Process for 12 minutes at a vacuum of 10 mbar and a temperature of 150° C.

In further experiments, products of the invention have been prepared from a plain base derived from farina, and demonstrate the aerated structure, smooth skin and light, crisp yet firm texture suitable for subsequent processing without breakage. Samples have been produced in a piped rounded bar format with flat sides suitable for cream sandwiching.

Another product of the invention, flavoured at normal confectionery levels with orange oil, demonstrates how little flavour is lost during the process (which is for reduced time and/or temperature because of the vacuum effect). Samples also demonstrate the addition of colour and acid for visual appeal and taste. Curly shapes can be produced ex rope formation, demonstrating how the pre-mass joins to itself during the processing of overlaps. Other samples are shown as sheet-cut rectangles.

Yet another product of the invention, given a very light caramel flavour and colour so that a "toasty" effect is obtained, demonstrates the desirable plasticity of the pre-mass in the simple preparation of alphabet letters, circles, hollow rings, moon shapes etc. Surplus pre-mass can of course be readily reworked.

Further examples of products of the invention which have been made:
small spheres which have a chocolate centre surrounded by an aerated crispy layer;
large spheres which are similar, demonstrating the result of incorporating glace cherry into a rope extrusion followed by spheroidal moulding;
thin sticks demonstrating how the material can be processed inside metal moulds (in this case single fingers) to give smooth sides and regular shape.
A range of samples has been prepared from apple powder, which can be readily obtained as a cheap by-product from fruit juice extraction:
number shapes demonstrate the finer cell structure using fruit base;
strip shapes have been rolled extremely thinly (1.0 mm) prior to expansion, and demonstrate the ability to produce a wafer or flatbread structure;
these strips also demonstrate the possibility of flake production for replacing cereals in bar engrossing operations;
triangles and tubes, in which the outside is apple and the inside filling is lime, demonstrate possibilities using batch roller technology allied to form press methodology.

I claim:
1. A process for preparing a snack food product comprising:
aerating a plastic mass of a mixture of an edible particulate snack food base material, gum acacia, an edible viscosity modulator, an edible protein and water;
heating the aerated mass in a chamber for setting the mass while applying a vacuum in the chamber for expanding the aerated mass; and then
releasing the vacuum and removing the expanded mass from the chamber.

2. A process according to claim 1 wherein the aerated mass is heated at a temperature of from 80° C. to 180° C. and wherein a vacuum of from 10 mbar to 250 mbar is applied.

3. A process according to claim 2 wherein the aerated mass is heated and the vacuum is applied for up to 15 minutes.

4. A process according to claim 1 wherein the mass is aerated to an extent for, in combination with applying the vacuum, obtaining a product having a density of less than 0.1 g/cm$^3$.

5. A process according to claim 1 further comprising, prior to heating and applying the vacuum to the aerated mass, co-extruding the aerated mass with a flavoring for shaping the aerated mass around the flavoring and then heating and applying the vacuum to the aerated mass and flavoring.

6. A process according to claim 2 wherein the shaped aerated mass has a thickness of from 1 mm to 5 mm.

7. A process according to claim 1 wherein the edible snack food base material is selected from a group consisting of fruits and vegetables.

8. A process according to claim 1 wherein the gum acacia is in an amount of from 5% to 15% by weight of the mass to be aerated, the protein is in an amount of from 1% to 3% by weight of the mass to be aerated, the viscosity modulator is in an amount of from 20% to 30% by weight of the mass to be aerated and water is in an amount of from 15% to 30% by weight of the mass to be aerated.

9. A process according to claim 1 wherein the protein is selected from a group consisting of milk proteins and soya proteins and the viscosity modulator is selected from a group consisting of hydrolyzed starches and sugar syrups.

10. A product of the process of any one of claims 1, 4, 7, 8, or 9.

11. A snack food product comprising an expanded mass of a mixture of an edible particulate snack food base material, gum acacia, an edible viscosity modulator and an edible protein.

12. An product according to claim 11 wherein the product has a density of less than 0.1 g/cm$^3$.

13. A product according to claim 11 wherein the edible snack food base material is selected from a group consisting of fruits and vegetables.

14. A product according to claim 11 wherein the gum acacia is in an amount of from 5% to 15% by weight of the mass, the protein is in an amount of from 1% to 3% by weight of the mass and the viscosity modulator is in an amount of from 20% to 30% by weight of the mass.

15. A product according to claim 11 wherein the protein is selected from a group consisting of milk proteins and soya proteins and the viscosity modulator is selected from a group consisting of hydrolyzed starches and sugar syrups.

16. A composition for preparing a snack food product comprising a mass of a mixture of an edible particulate snack food base material, gum acacia, an edible viscosity modulator, an edible protein and water.

17. A composition product according to claim 16 wherein the edible snack food base material is selected from a group consisting of fruits and vegetables.

18. A composition according to claim 16 wherein the gum acacia is in an amount of from 5% to 15% by weight of the mass, the protein is in an amount of from 1% to 3% by weight of the mass, the viscosity modulator is in an amount of from 20% to 30% by weight of the mass and the water is in an amount of from 15% to 30% by weight of the mass.

19. A composition according to claim 16 wherein the protein is selected from a group consisting of milk proteins and soya proteins and the viscosity modulator is selected from a group consisting of hydrolyzed starches and sugar syrups.

* * * * *